United States Patent
Myers et al.

[11] Patent Number: 6,133,999
[45] Date of Patent: Oct. 17, 2000

[54] MEASURING SIDEWALL THICKNESS OF GLASS CONTAINERS

[75] Inventors: Ronald T. Myers, Whitehouse; Paul W. L. Graham, Toledo, both of Ohio

[73] Assignee: Owens-Brockway Glass Container Inc., Toleod, Ohio

[21] Appl. No.: 09/058,180

[22] Filed: Apr. 10, 1998

[51] Int. Cl.$^7$ .............................. G01N 21/00; G01B 11/06
[52] U.S. Cl. ................................ 356/239.4; 356/239.5; 356/382
[58] Field of Search ................. 356/429, 239.4, 356/239.5, 244, 382, 381

[56] References Cited

U.S. PATENT DOCUMENTS

| | | | |
|---|---|---|---|
| 3,302,786 | 2/1967 | Conrad | 356/239.5 |
| 3,989,380 | 11/1976 | Spitz | 356/244 |
| 4,207,000 | 6/1980 | Miller | 356/33 |
| 4,459,023 | 7/1984 | Reich et al. | 356/237 |
| 4,547,067 | 10/1985 | Watanabe | 356/239 |
| 4,601,395 | 7/1986 | Juvinall et al. | 209/526 |
| 4,650,326 | 3/1987 | Nagamine et al. | 356/240 |
| 4,668,086 | 5/1987 | Redner | 356/33 |
| 4,822,171 | 4/1989 | Brand et al. | 356/382 |
| 5,291,271 | 3/1994 | Juvinall et al. | 356/382 |
| 5,305,081 | 4/1994 | Gooch et al. | 356/240 |
| 5,400,131 | 3/1995 | Stockley et al. | 356/33 |

*Primary Examiner*—Frank G. Font
*Assistant Examiner*—Zandra V. Smith

[57] ABSTRACT

Apparatus for measuring glass layer thickness in the sidewall of a glass container in which a container is placed in a bath of oil having an index of refraction matching that of the container outer sidewall surface. The body of the container is engaged within the bath to permit rotation while restraining lateral motion as the finish of the container is rotated. Light energy is directed through the bath and tangentially through the sidewall of the container so as to establish a pattern of light energy as a function of sidewall layer thickness, and layer thickness is determined as a function of such light pattern. As applied specifically to measuring thickness of the casing glass layer in a cased glass container in accordance with the preferred method of the invention, such casing glass thickness is determined as a function of the pattern in the light energy that emerges from the oil bath.

49 Claims, 9 Drawing Sheets

MEASURING SIDEWALL THICKNESS OF GLASS CONTAINERS

The present invention is directed to measuring sidewall thickness of a hollow glass container, and more particularly to a method and apparatus for measuring the thickness of layers in multi-layer glass containers.

BACKGROUND AND OBJECTS OF THE INVENTION

In the manufacture of multi-layer glass containers, it is desirable to measure the thickness of the glass layers in order to control the quality of the containers. In so-called cased glass containers, an internal relatively thick layer of core glass is surrounded by an external relatively thin layer of casing glass. The thermal characteristics of the core and casing glasses are such that the outer casing glass layer is placed under compressive stress as the glass container cools. This compressed glass outer layer enhances the strength of the overall container, and allows manufacture of containers having desired strength properties using less total glass.

In order to control the manufacturing process from both a cost and quality standpoint, it is necessary to measure and control the thickness of the casing glass layer. In the past, the thickness of the casing glass layer has been measured by cutting a section from the container sidewall and measuring the glass layer thicknesses using a microscope or the like. This technique is expensive to implement, and is not well suited for use as a real-time quality control technique in mass production of containers. It has been proposed to employ electro-ol techniques to measure thickness of the internally stressed casing glass layer using polarized light. Transmission of the polarized light tangentially through the casing glass layer of the container sidewall causes a birefringence pattern, which can be analyzed to determine casing glass layer thickness. A container under test is vertically immersed in a bath of oil, and the finish of the container is coupled to appropriate means for rotating the container in the bath about its central axis. A polarized light source is disposed to direct light energy through the bath along an axis tangential to the sidewall of the container onto a sensor. The oil is needed to match the index of refraction of the container sidewall so that the light energy travels tangentially through the container sidewall to the sensor, rather than being reflected from the sidewall onto the wall of the tub containing the bath. The sensor includes appropriate means responsive to birefringence in the light energy incident thereon for measuring the thickness of the internally stressed outer glass layer of the container.

The technique so described does not provide satisfactory results. Glass containers are not always symmetrical about their axes of rotation, and the body of the is container is not always coaxial with the container neck or finish. Thus, if the container is out-of-round or has a body axis that is non-coincident with the axis of the finish, the sidewall of the container will wobble with respect to the light path as the container is rotated in the index oil. This wobble may be on the order of one-half inch, as compared with a desired measurement accuracy on the order of 0.001 inch. Furthermore, the described technique leads to substantial wastage of expensive index oil. It is therefore a general object of the present invention to provide a method and apparatus for optically measuring the thickness of a casing glass layer in a cased glass bottle of the described character by measuring stress in the container sidewall, in which the container is accurately positioned and held in position during the measurement process. Another object of the present invention is to provide a method and apparatus of the described character in which the amount of index oil used is greatly reduced, and which are adapted to measure casing glass thickness at varying position both axially and circumferentially around the container. Another object of the present invention is to provide a method and apparatus that satisfy the foregoing objectives, that are adapted to obtain rapid and accurate measurement of casing glass thickness, and that can thus be used for real-time control of the glassware manufacturing process.

SUMMARY OF THE INVENTION

Apparatus for measuring glass layer thickness in the sidewall of a glass container in accordance with a presently preferred embodiment of the invention includes a bath of oil having an index of refraction matching that of the container sidewall exterior surface. The body of the container is engaged within the bath to permit rotation while restraining lateral motion as the finish of the container is rotated. Light energy is directed through the bath tangentially through the sidewall of the container so as to establish a pattern of light energy as a function of sidewall layer thickness, and layer thickness is determined as a function of such light pattern. As applied specifically to measuring thickness of the casing glass layer in a cased glass container in accordance with the preferred implementation of the invention, such casing glass thickness is determined as a function of the pattern in the light energy that emerges from the oil bath. In applications in which the indices of refraction of the core glass and the casing glass are sufficiently different, reflections from the casing/core boundary allow direct thickness measurement. In applications in which the glass indices of refraction are more closely matched, the light energy may be polarized, so that a birefringence pattern will be established by the internal stress in the casing layer. This birefringence pattern may be analyzed to determine casing glass thickness.

The oil bath in the preferred embodiment of the invention comprises a trough having a pair of transparent sidewalls through which the measurement light is directed, a pair of spaced end walls, a bottom wall and an open top for receiving a test container. The container is supported within the bath by a cradle in the form of a pair of spaced cradle plates, each having a contoured edge for slidably externally horizontally supporting the sidewall of the container. Sliding engagement between the container sidewall and the cradle plates is lubricated by the index oil. Lead screws are rotatably supported by the bath end plates and engage the cradle plates for adjustably positioning the cradle plates within the bath to accommodate containers of differing length. A bracket is pivotally mounted to one bath end wall, and carries an arm for externally engaging the sidewall of the container to hold the container body against the cradle against buoyancy of the container in the oil. The bracket is positioned to be engaged by the bottom of a container as the container is placed on the cradle for automatically pivoting the arm into engagement with the container body. A counterweight is carried by the bracket for automatically pivoting the bracket and arm out of engagement with the container as the container is lifted from the cradle following a measurement sequence. In the preferred embodiment of the invention, the position of both the hold-down arm and the counterweight are adjustable on the bracket for accommodating containers of differing size.

The light energy is directed from a light source positioned on one side of the oil bath through the transparent sidewalls of the oil bath onto a camera disposed at the opposite side of the oil bath. The light source in the preferred embodiment of the invention comprises a source of white light, and the light may be vertically polarized before transmission through the bath. The intensity of the measurement light beam may be adjustably varied to accommodate glass materials (e.g., flint glass and amber glass) of differing opacity. In order to insure that the measurement light beam is tangentially incident on the container sidewall, the bath is vertically adjustably positionable with respect to the light source and camera. In order to measure casing glass thickness at different positions axially of the container, the container and bath are horizontally adjustable with respect to the light source and camera. In the preferred embodiment of the invention, a compliant chuck engages the inside diameter of the container finish for rotating the container body on the cradle while accommodating non-concentricity between the container finish and the container body.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
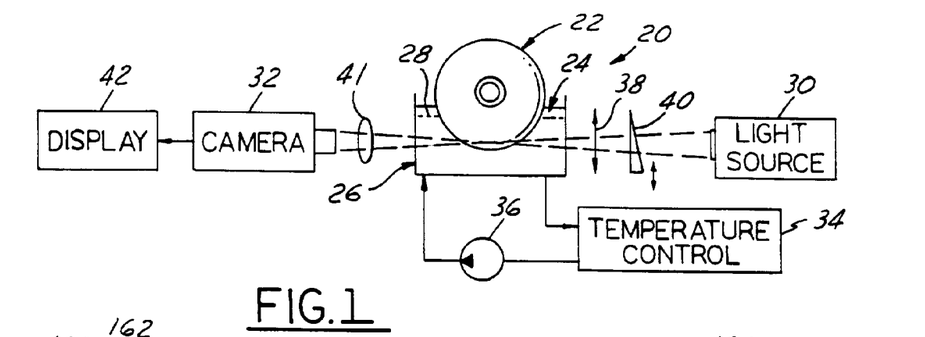
FIG. 1 is a schematic diagram of an apparatus for measuring stress in the sidewall of a glass container in accordance with a presently preferred embodiment of the invention.

FIG. 1 illustrates an apparatus 20 for measuring stress in a the sidewall of a container 22 in accordance with a presently preferred embodiment of the invention. Container 22 is supported on a cradle 24 within a bath 26 containing an index oil 28. A light source 30 is positioned on one side of bath 26 for directing and focusing a beam of light energy through the transparent sidewalls of bath 26 onto a camera 32. Bath 26 is positioned such that the light beam from source 30 travels tangentially through the container sidewall. Oil 28 matches the index of refraction of the container sidewall exterior surface so that the light energy is not reflected from the container sidewall, but rather travels tangentially through the container sidewall to camera 32. The index properties of oil 28 are closely controlled by circulating the index oil externally of bath 26 through a temperature control device 34 and a pump 36. Thus, the refractive properties of the index oil may be closely controlled and maintained to match those of container 22. A polarizer 38 may be selectively positioned in the light path for vertically polarizing the light energy incident on bath 26, and a variable attenuator 40 is provided for accommodating glasses of differing opacity. That is, attenuator 40 is adjusted approximately to normalize the light intensity incident on camera 32 for glasses of differing opacity—e.g., flint glass which is substantially clear versus amber glass which is more opaque. A telephoto lens 41 focuses the field of view of camera 32 onto the exterior surface of container 22 in cradle 24 at the point of tangential intersection with the illumination beam. Camera 32 is coupled to a display 42 for displaying sidewall stress information to an operator.

Figure 2:
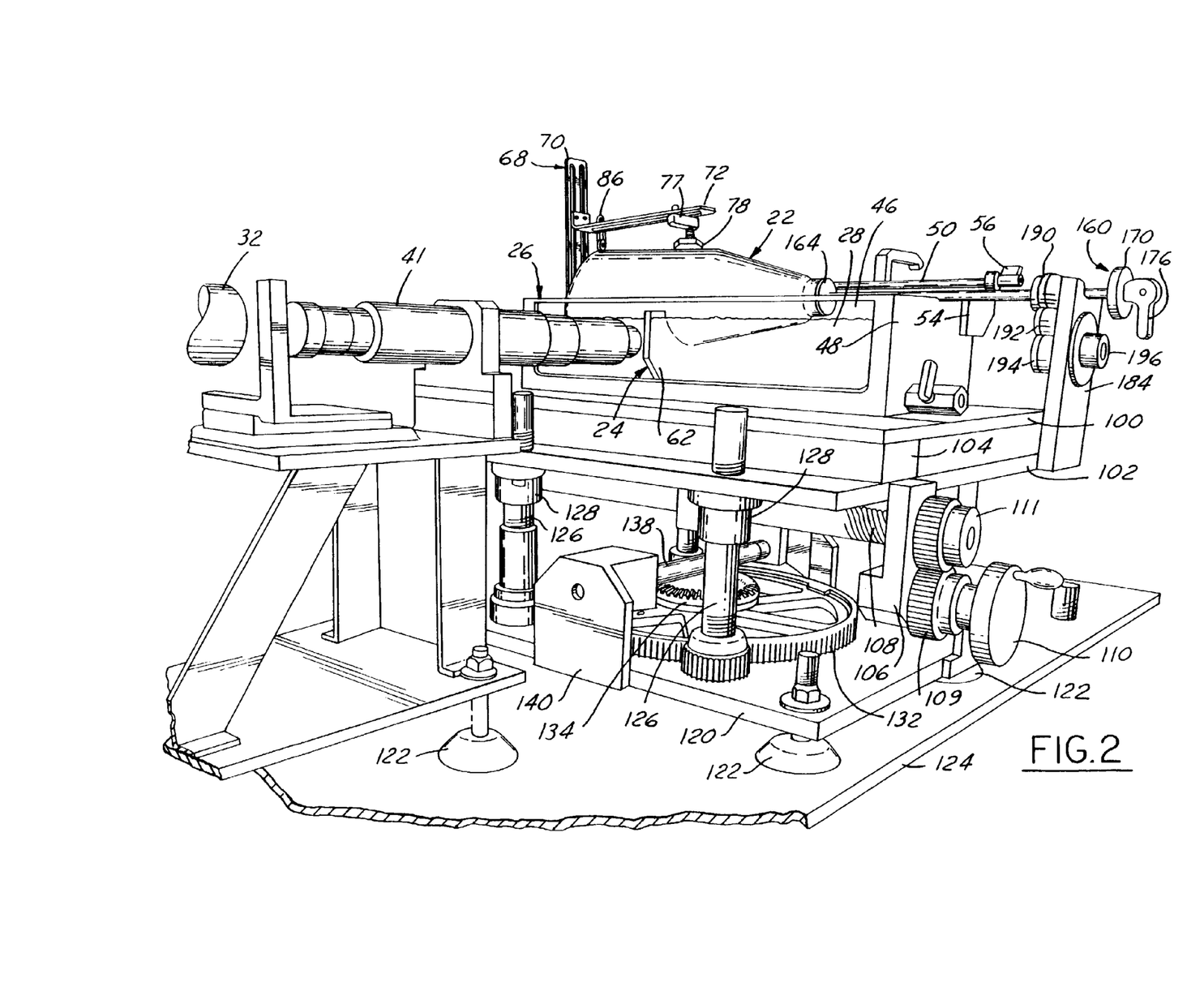
FIG. 2 is a perspective view of the measurement apparatus illustrated schematically in FIG. 1.
Figure 3:
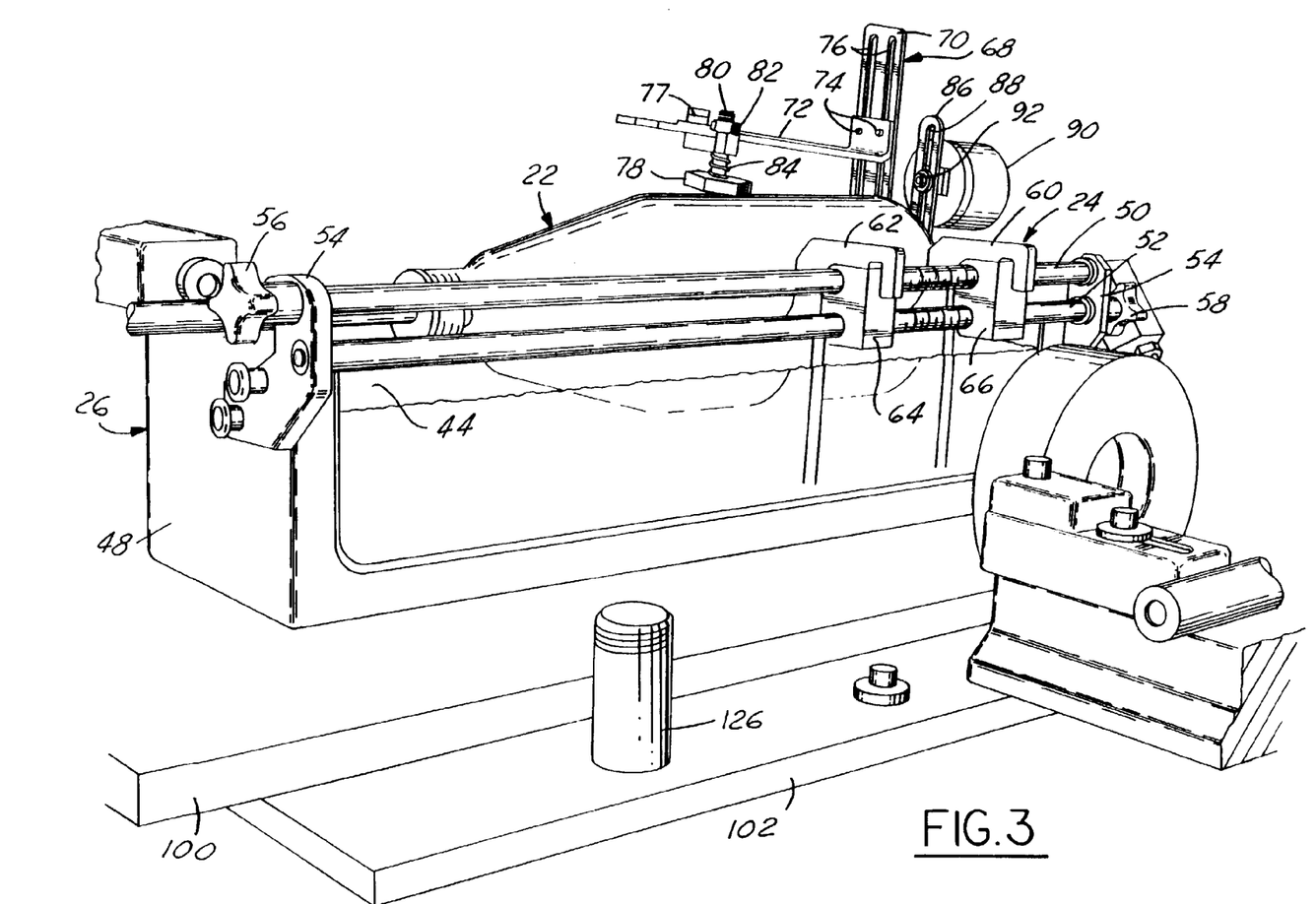
FIG. 3 is a perspective view of the apparatus in FIG. 2 taken from a differing direction.

Referring to FIGS. 2–3, bath 26 comprises a generally rectangular trough in which a pair of transparent sidewalls 44, 46 are mounted. The trough also has end walls 48 and an closed bottom that is suitably sealed to contain a volume of index oil 28. The top of bath 26 is open to receive a container 22 under test. A pair of screw rods 50, 52 extend between bath end walls 48 parallel to the longitudinal axis of the bath, being rotatably supported above and to the side of bath 26 by a pair of end brackets 54 externally affixed to end walls 48. Screw rod 50 is coupled to a knob 56 adjacent to one end wall 48, while screw rod 52 is coupled to a knob 58 adjacent to the opposing end wall 48. Thus, screw rods 50, 52 may be freely manually rotated while being held in fixed position adjacent to bath 26.

Figure 13:
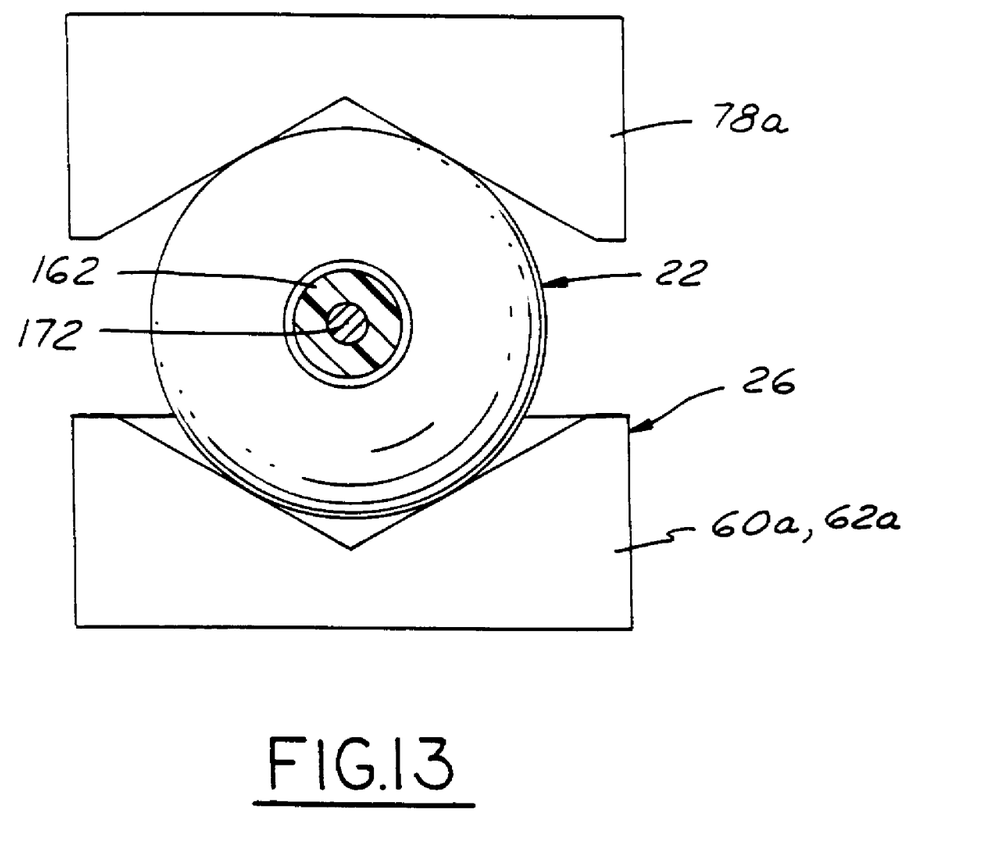
FIG. 13 illustrates an oil bath that features a modified cradle plate configuration.

Cradle 24 comprises a pair of cradle plates 60, 62 disposed within bath 26. Each cradle plate 60, 62 has a concave upper edge contoured to receive and support the cylindrical body of a container 22. These container-supporting edges are circular in the embodiment illustrated in the drawings. Alternatively, the container-supporting edges may be V-shaped, as shown schematically in FIG. 13. Such V-shaped cradle plates 60a, 62a provide additional lateral support to the container during rotation. Cradle plate 62 is removably cantilevered from a holder block 64, which is rotatably coupled to screw rod 50 and through which screw rod 52 freely passes. In the same manner, cradle plate 60 is cantilevered from a holder block 66, which is rotatably coupled to screw rod 52 while screw rod 50 passes freely therethrough. Thus, the longitudinal positions of cradle plates 60, 62 within bath 26 may be independently adjusted by means of knobs 58, 56 respectively. Cradle plates 60, 62 are removable from blocks 66, 64, and thus may be replaced by cradle plates of differing contour to accommodate containers 22 of differing diameter.

Figures 4, 5:
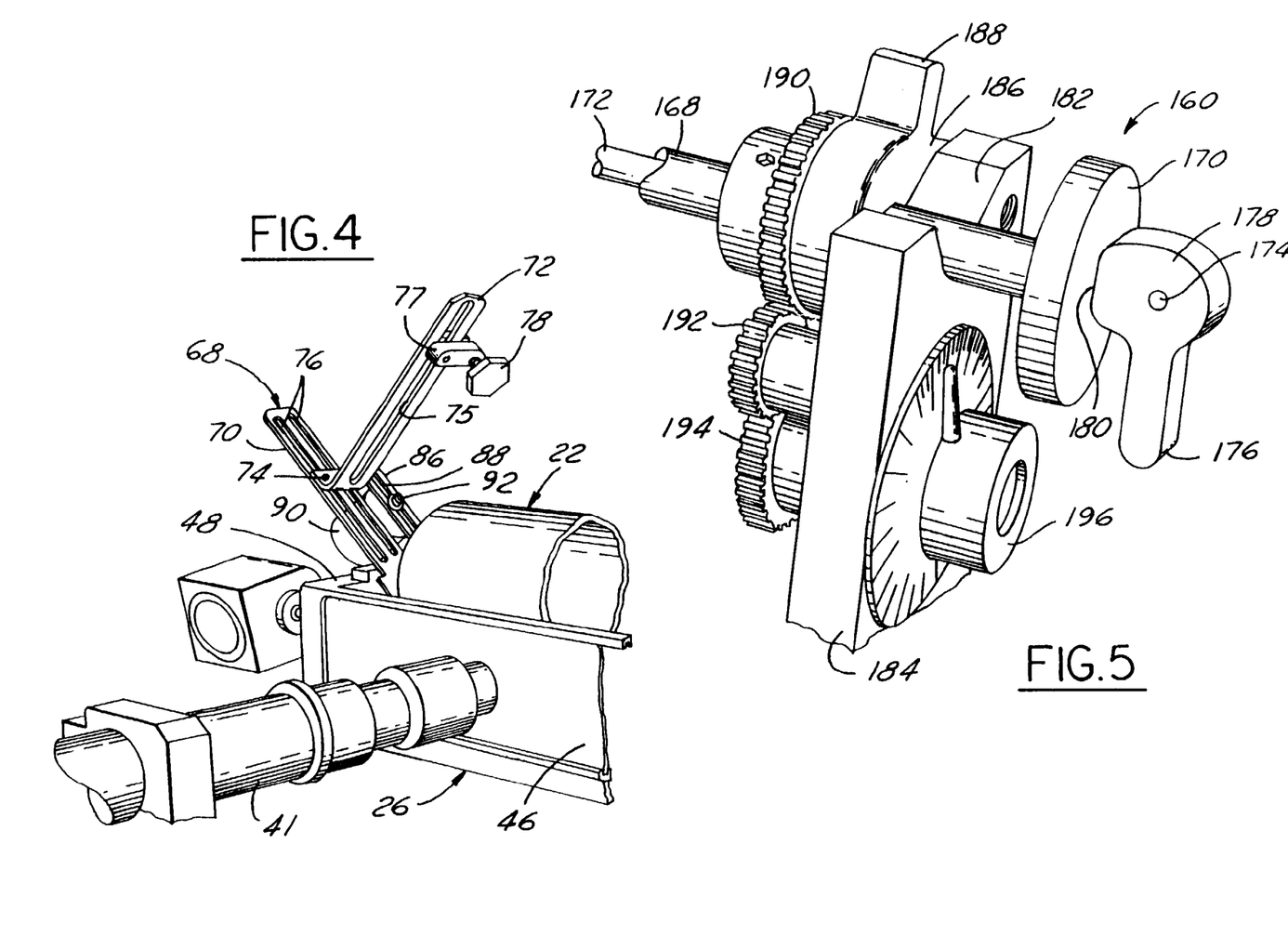
FIGS. 4 and 5 are fragmentary perspective views showing details of portions of the apparatus illustrated in FIGS. 2–3.
Figure 6:
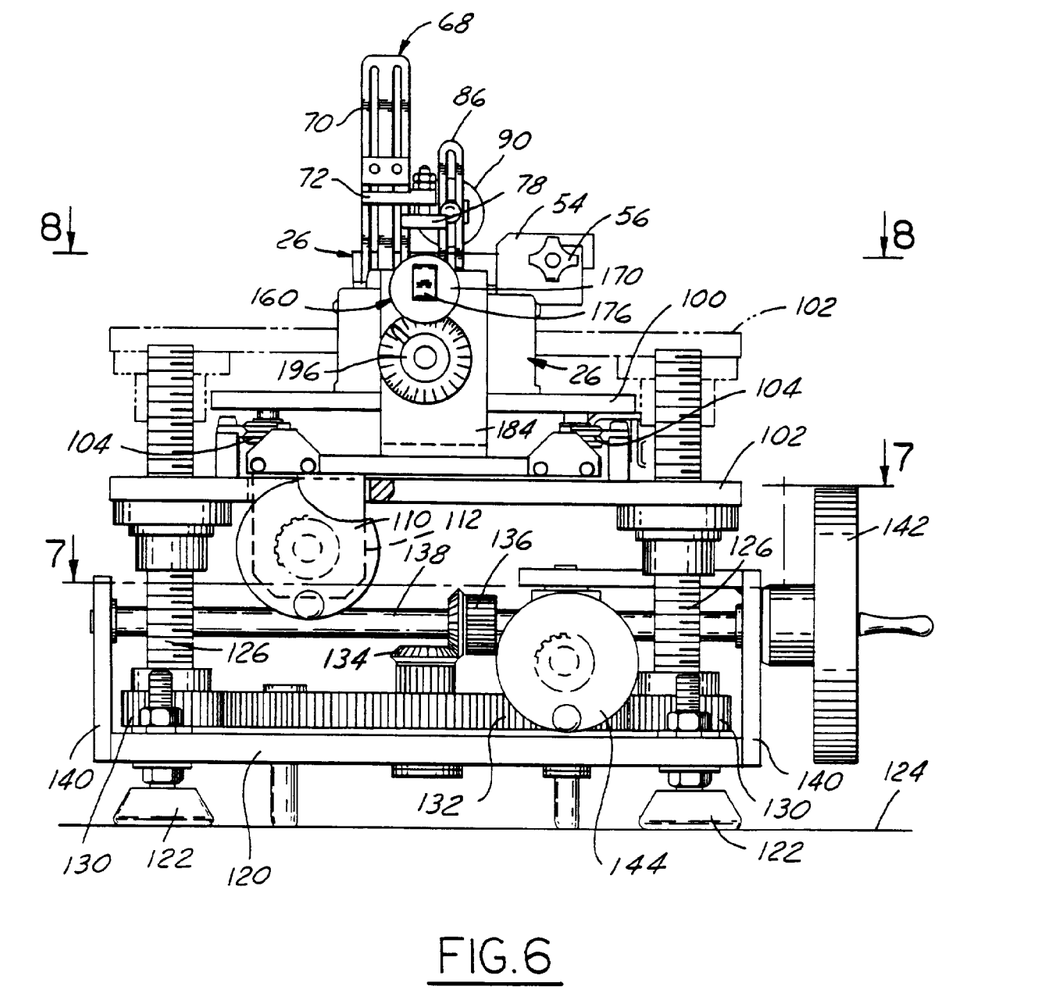
FIG. 6 is an end elevational view of the apparatus illustrated in FIGS. 2–5.
Figure 7:
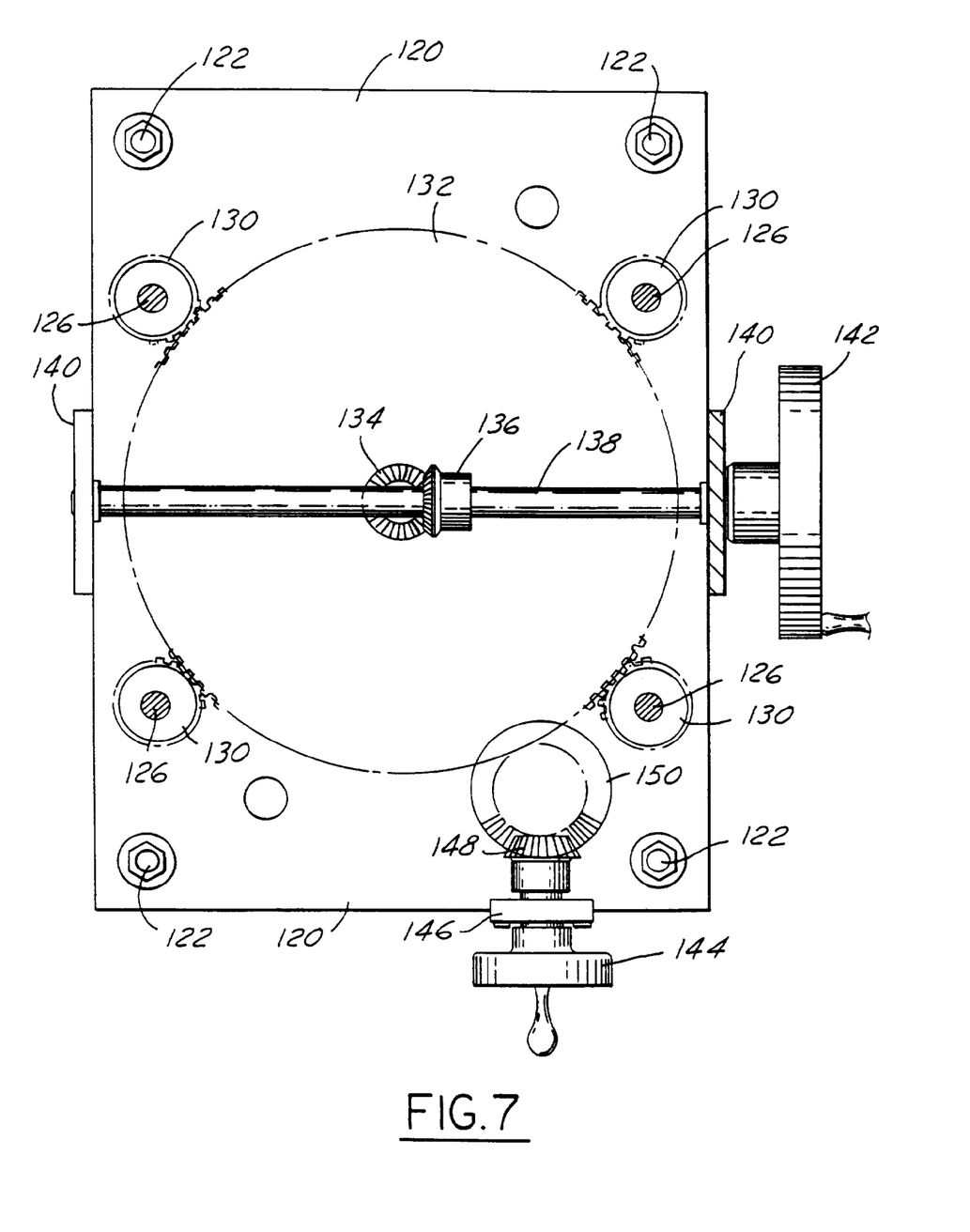
FIGS. 7 and 8 are sectional views taken substantially along the lines 7—7 and 8—8 in FIG. 6.

Referring to FIGS. 2–4 and 6, a hold-down bracket 68 comprises a flat plate pivotally mounted to one end wall 48 of bath 26. Bracket 68 comprises a pair of coplanar parallel legs 70, 86 that extend upwardly from bath 26. An L-shaped arm 72 is adjustably mounted on leg 70 by means of a pair of mounting screws 74 extending through a pair of parallel slots 76 in arm 70. Arm 72 extends from plate 68 over bath 26. A block 77 is slidably mounted on arm 72 by means of a screw that extends through a longitudinal slot 75 on arm 72. A pad 78 has a threaded shaft 80 that is adjustably positionable on block 77 by means of a nut 82. (A V-shaped pad 78a in FIG. 13 may be employed for additional lateral support during rotation.) A coil spring 84 is captured in compression around shaft 80 between pad 78 and block 77. The second leg 86 of bracket 68 contains an elongated slot 88 within which a counterweight 90 is mounted by means of a screw and a nut 92. The lower end of bracket 68 is positioned to be engaged by the bottom of a container 22 when the container is positioned on cradle 24, as shown in FIG. 4. Positioning of container 22 within the cradle and pressing of the container bottom against bracket 68 pivots the bracket against the weight of counterweight 90 from the open position illustrated in FIG. 4, in which pad 78 is pivoted upwardly away from the container, to the closed position illustrated in FIGS. 2 and 3 in which pad 78 engages the container. Pad 78 thus holds container 22 on cradle 24. When it is desired to remove the container from the cradle, withdrawal of the container axially of the cradle removes the force of the container against bracket 68, so that the bracket is automatically pivoted by weight 90 from the position shown in FIGS. 2 and 3 to that shown in FIG. 4. Arm 72 is adjustably positionable on bracket 68, and weight 90 is adjustably positionable on bracket 68, to accommodate containers 22 of differing diameter and differing weight. Block 77 is adjustably positionable on arm 72 to accommodate containers of differing length. Spring 84 functions to urge pad 78 into sliding engagement with container 22 while preventing excessive clamping force. Sliding engagement between pad 78 and the outer surface of container 22 will be lubricated by the index oil, as will the sliding engagement between container 22 and cradle plates 60, 62.

Oil bath 26 is mounted on a flat oil pan 100 (FIGS. 2–3, 6 and 8–9). Oil pan 100 is mounted on an intermediate support plate 102 by a pair of laterally spaced linear bearings 104, which accommodate movement of pan 100 and bath 26 in the longitudinal direction of the bath—i.e., into the page in FIG. 6—while preventing lateral motion of the bath—i.e., side to side in FIG. 6. Linear bearings 104 may be of any suitable character. Support plate 102 carries longitudinally spaced depending bearings 106 (FIGS. 8 and 9) that rotatably support a lead screw 108. Lead screw 108 is coupled by intermeshed spur gears 109, 111 to a handle 110 at the front of the apparatus. A leg 112 depends from oil pan 100 through a slot 114 in support plate 102 (FIG. 8), and terminates in a nut 115 that encompasses lead screw 108. Thus, the horizontal position of oil pan 100, and oil bath 26 carried thereby, may be adjustably positioned longitudinally of support plate 102 by rotation of handle 110 and lead screw 108.

Figure 8:
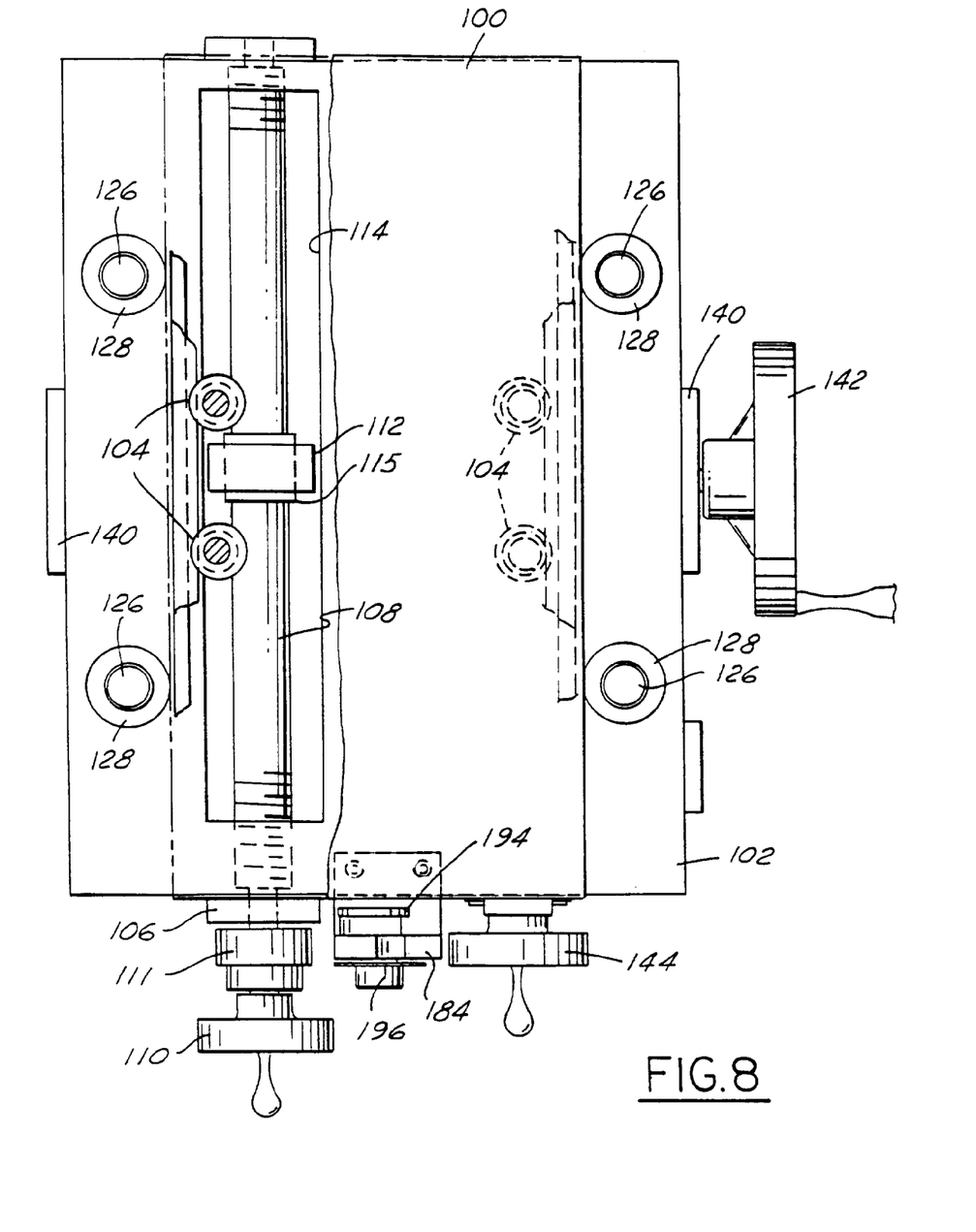
Figure 9:
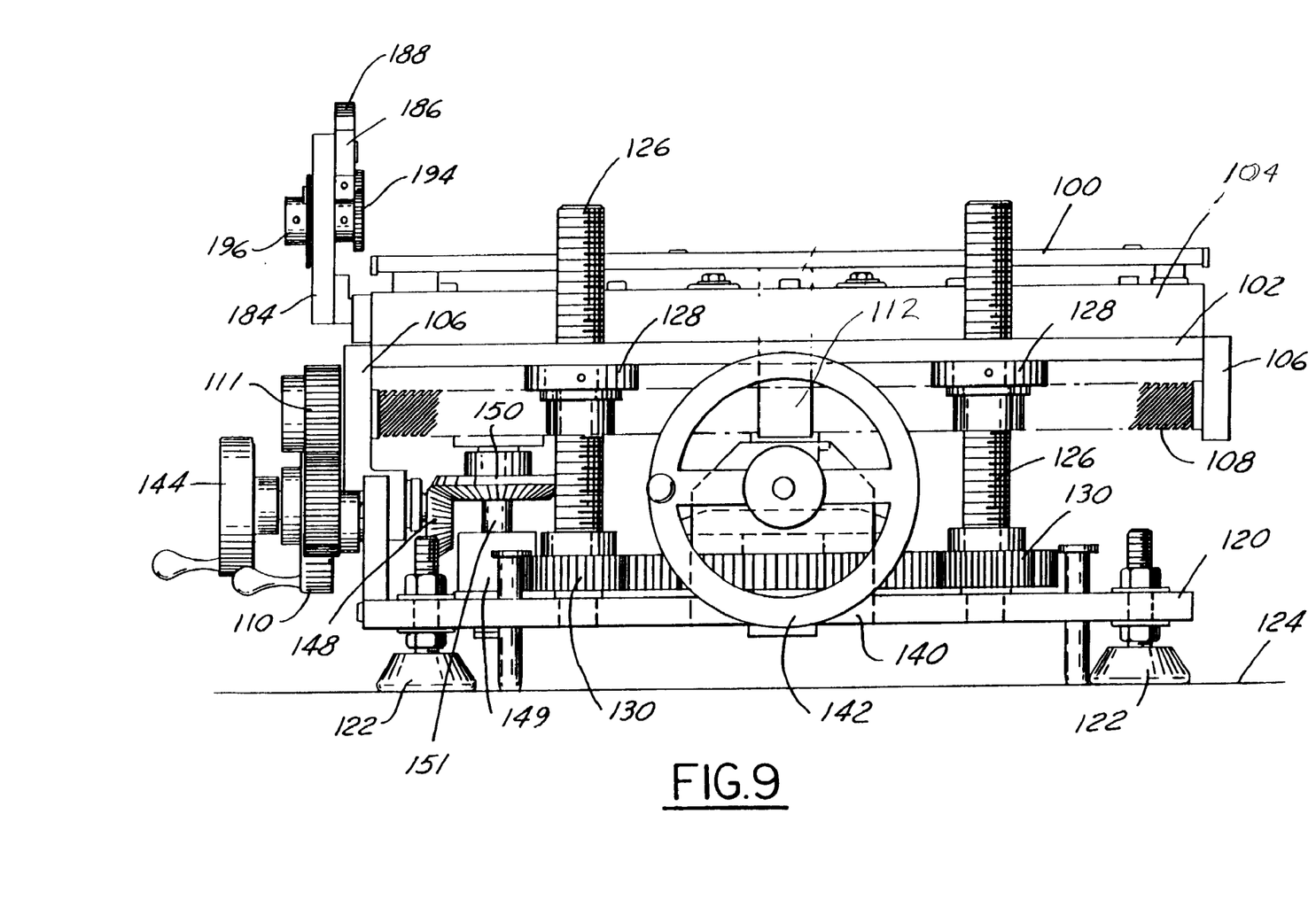
FIG. 9 is a fragmentary end elevational view of the apparatus illustrated in FIGS. 2–8.
Figure 10:
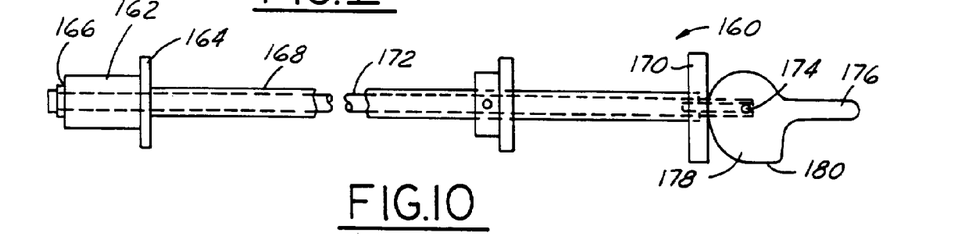
FIG. 10 is a fragmentary elevational view of the container chuck in the apparatus of FIGS. 1–9.

A base plate 120 (FIGS. 2–3, 6–7 and 9) is supported by adjustable feet 122 above a work surface 124. Four lead screws 126 are supported on base plate 120 at the corners of a square (as best seen in FIG. 8) for rotation about parallel vertical axes. Lead screws 126 are rotatably received in four nuts 128 carried by plate 102 (FIGS. 2 and 6–9). Each lead screw 126 carries a spur gear 130 adjacent to base plate 120. The several gears 130 mesh with a central spur gear 132 that is rotatable on a vertical axis above the plane of base plate 120. Gear 132 is coupled by bevel gears 134, 136 to a horizontal shaft 138. Shaft 138 is rotatably supported by support plates 140 that extend upwardly from base plate 120, and is connected to a hand wheel 142. A second hand wheel 144 is coupled through a plate 146 on base plate 120 to intermeshed bevel gears 148, 150. Bevel gear 150 (FIG. 9) is connected by a shaft 151 to a spur gear 149 that is meshed with gear 132. Thus, lead screws 126 are rotated, and mounting plate 120 is raised and lowered, by rotation of either hand wheel 142 or 144. Wheel 142 provides for coarse adjustment of the vertical position of plate 102, while wheel 144 provides for fine adjustment of vertical position of plate 102. Light source 30 (FIG. 1), telephoto lens 41 (FIGS. 1 and 2) and camera 42 are mounted on work surface 124 by suitable mounting brackets separate from plate 120.

A chuck 160 for engaging and rotating the container is illustrated in FIGS. 2–3, 5–6 and 10. Chuck 160 includes a sleeve 162 of elastomeric material such as rubber. Sleeve 162 is captured between a pair of washers 164, 166. An elongated hollow sleeve 168 extends between washer 164 and a second washer 170. A rod 172 is affixed at one end to washer 166 and extends through the interior of sleeve 168. On the remote side of washer 170, rod 172 is mounted by a pivot pin 174 to a chuck lever 176. Lever 176 has an elongated convex lobe 178 that slidably engages the opposing surface of washer 170 to cooperate with the axial elasticity of sleeve 162 to form a toggle clamp. In the open position of the chuck and clamp, illustrated in FIG. 10, sleeve 162 is relaxed, and the handle of lever 176 extends axially outwardly. When lever 176 is pivoted clockwise (in the orientation of FIG. 10), sleeve 162 is compressed between washers 164, 166, until the flat 180 of lobe 178 opposes washer 170, at which point the toggle clamp is locked in position. To engage the finish of a container, and with lever 176 in the position of FIG. 10, sleeve 162 and washer 166 are inserted into the open end of the container finish until the sealing surface of the container abuts washer 164. Lever 176 is then pivoted (clockwise in FIG. 10) to expand sleeve 162 radially outwardly and thereby firmly engage the inside diameter of the container finish. With the chuck firmly engaged with the container and lever 176 in the locked position of FIGS. 2 and 6, the container is now inserted into the apparatus by placement on cradle plates 62, 66 in abutment with bracket 68. Hold-down bracket 68 and pad 78 are thereby pivoted downwardly into engagement with the exterior of the container. Outer sleeve 168 is rested in the V-shaped slot 182 of 15 a chuck mounting bracket 184 (FIGS. 2, 5 and 8) that extends upwardly from mounting plate 102. An arcuate clamp 186 (FIG. 5) is pivotally mounted on bracket 184, and has a radially projecting handle 188 by means of which clamp 186 may be pivoted so as to capture chuck 160 on the assembly, as shown in FIG. 5. A spur gear 190 is adjustably positionable on chuck sleeve 168 for engagement in assembly with gears 192, 194 carried by bracket 184. Gear 194 is coupled to a dial indicator 196 carried on the outer face of bracket 184. Thus, an operator may rotate chuck 160, and simultaneously rotate container 22 within the test apparatus, with the degree of angular rotation being indicated to the operator at indicator 196. Elasticity of sleeve 162 in chuck 160 accommodates slight misalignment of the axis of the finish with respect to the axis of the container body, so that the body will continue to be held in fixed position against cradle 24 within bath 26.

In operation, apparatus 20 is first set up with a container 22 of known characteristics. Chuck 160 is fitted into the finish of container 22, and container 22 is mounted on cradle 24 of bath 26. As the container is mounted on the cradle, bracket 68 and arm 72 are pivoted downwardly so that pad 78 engages and holds container 22 on cradle 24. Chuck 160 is then placed on bracket 184, and clamp 186 is closed over chuck 160. With light source 30, camera 32 and display 42 operating, and with oil 28 of bath 26 at desired temperature, vertical position of bath 26 is adjusted by means of adjustment wheels 142, 144 until display 42 shows intersection of the light beam with the area of interest at the container. Wheel 110 is then adjusted so that the beam will intersect the container at the desired axial position, and chuck 160 is rotated so that the beam intersects the container sidewall at the desired angular position. With the apparatus set for operation, a new container 22 to be tested is then placed on chuck 160 and inserted into the apparatus.

Figure 11:
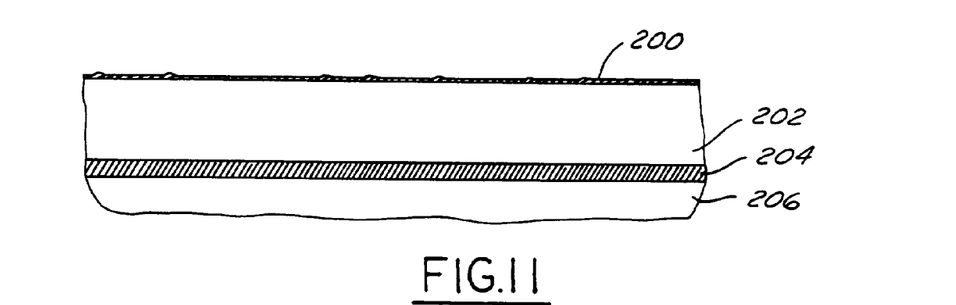
FIGS. 11 and 12 illustrate container thickness displays in the apparatus of FIG. 1.
Figure 12:
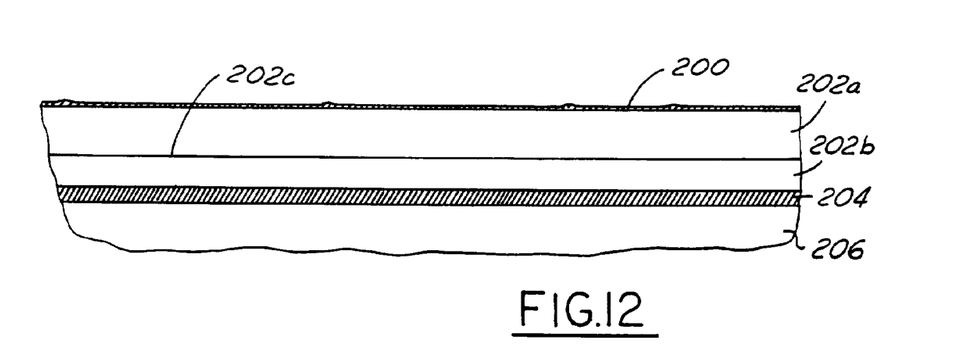

If the indices of refraction of the casing and core glass are sufficiently different (e.g., 1.520 versus 1.522), reflection from the casing/core interface may be employed, and polarizer 38 (FIG. 1) need not be used. Referring to FIG. 11, a slight refraction at the bottom tangent to the outer surface produces a dark line 200 against an otherwise bright background at camera 32 and display 42. The index mismatch at the casing/core interface produces a second dark line 204 because the light rays are reflected at the interface away from the camera. The casing layer produces the relatively thick bright area 202, and the core layer produces the relatively bright area 206. The thickness of the casing layer may readily be measured by comparing the width of area 202 to corresponding images of known thickness. The beam and display are not wide enough radially of the container to show the glass/air interface at the inside of the core layer. FIG. 12 illustrates a potential problem, in which the line 202c between the casing glass images 202a, 202b indicates possible layering within the casing glass layer. In situations in which the indices of refraction in the glass layers are more closely matched, polarized light may be employed to establish a birefringence pattern indicative of the internally stressed casing glass layer thickness.

There are thus provided a method and apparatus for measuring stress in the sidewall of glass containers, and particularly for measuring thickness of the stressed casing glass layer in a cased glass bottle, that fully satisfy all of the objects and aims previously set forth. Containers may be rapidly tested in a manufacturing environment for real-time quality control of the manufacturing process. Casing glass thickness may be measured at any desired position circumferentially of the container or axially of the container. The manual embodiment of the invention herein disclosed may be readily automated by suitably coupling the circumferential and axial adjustments to automated adjustment means such as electric motors. Very little indexing oil is lost during the measurement process. In particular, the compliant chuck mechanism of the present invention not only prevents entry of oil into the inside of the container, but also accommodates wobble and misalignment of the container body with respect to the finish while maintaining integrity of the measurement process.

What is claimed is:

1. Apparatus for measuring glass layer thickness in a sidewall of a glass container having a body and a finish, comprising:

a bath of oil having an index of refraction matching that of the container sidewall, means for engaging a container body in said bath so as to permit rotation of the body about its axis while restraining motion of the body laterally of its axis, means for rotating the container on said engaging means, means for directing light energy through said bath and tangentially through the sidewall of the container body in said bath on said engaging means so as to establish a pattern of light energy as a function of thickness of glass in the container body sidewall, and means for determining glass thickness in the container sidewall as a function of said pattern of light energy.

2. The apparatus set forth in claim 1 wherein said means for engaging the container sidewall comprises means in said bath for sliding exterior engagement with the container sidewall, said sliding engagement being lubricated by said oil.

3. The apparatus set forth in claim 2 wherein said means in said bath comprises a cradle for externally engaging the sidewall of the container in said bath and slidably supporting the container in horizontal orientation in said bath.

4. The apparatus set forth in claim 3 wherein said cradle comprises a pair of cradle plates in said bath, each of said plates having a contoured edge for slidably externally supporting the sidewall of the container.

5. The apparatus set forth in claim 4 wherein said means for engaging the container sidewall further comprises means for adjustably positioning at least one of said plates in said bath to accommodate containers of differing axial dimension.

6. The apparatus set forth in claim 5 wherein said adjustably positioning means comprises means for adjustably positioning both of said plates in said bath independently of each other.

7. The apparatus set forth in claim 6 wherein said bath comprises a pair of optically transparent sidewalls that extend between spaced end walls, and wherein said adjustably positioning means comprises a pair of screw rods that extend between and are rotatably supported by said end walls, each of said screw rods being operatively coupled to one of said cradle plates for adjusting longitudinal position of the plate as a function of rotation of the screw rod.

8. The apparatus set forth in claim 7 wherein said adjustably positioning means further comprises a pair of blocks each rotatably coupled to one of said screw rods, each of said cradle plates being removably mounted on one of said blocks.

9. The apparatus set forth in claim 8 wherein said rods are mounted parallel to each other above and to one side of said bath, said cradle plates extending laterally and downwardly into said bath.

10. The apparatus set forth in claim 9 wherein said contoured edges of said plates are arcuate.

11. The apparatus set forth in claim 9 wherein said contoured edges of said plates are V-shaped.

12. The apparatus set forth in claim 3 wherein said bath comprises a pair of optically transparent sidewalls, a pair of spaced end walls and a bottom wall that together contain a volume of said oil.

13. The apparatus set forth in claim 12 further comprising means positioned above said cradle for slidably externally engaging the sidewall of a container on said cradle while holding the container on the cradle against buoyancy of the container in the oil.

14. The apparatus set forth in claim 13 wherein said holding means comprise a bracket pivotally mounted on one of said end walls and means on said bracket for engaging the sidewall of a container on said cradle.

15. The apparatus set forth in claim 14 wherein said bracket is positioned for engagement by the bottom of a container as the container is placed on said cradle for pivoting said bracket and said means on said bracket into engagement with the container.

16. The apparatus set forth in claim 15 wherein said means on said bracket comprises an arm that extends from said bracket over a container on said cradle, and abutment means carried by said arm for engagement with the container.

17. The apparatus set forth in claim 16 wherein said abutment means comprises an abutment pad and a coil spring for biasing said pad into engagement with the container.

18. The apparatus set forth in claim 17 wherein said means on said bracket further comprises means for adjusting position of said arm on said bracket for accommodating containers of differing diameter.

19. The apparatus set forth in claim 18 wherein said holding means further comprises counterweight means on said bracket for pivoting said bracket and said arm out of engagement with the container sidewall as the container is moved off of said cradle.

20. The apparatus set forth in claim 19 wherein said holding means further comprises means for adjusting position of said counterweight means on said bracket.

21. The apparatus set forth in claim 12 wherein said light energy directing means comp rises a light sour ce positioned on one side of said bat h to direct light energy through said transparent sidewalls and through said bath, and wherein said identifying means comprise light sensor means position to receive light energy transmitted through said bath.

22. The apparatus set forth in claim 21 wherein said light source includes means for polarizing light energy transmitted into said bath.

23. The apparatus set forth in claim 22 wherein said polarizing means comprises means for vertically polarizing said light energy.

24. The apparatus set forth in claim 22 wherein said light source further includes means for variably attenuating intensity of light energy of transmitted into said bath.

25. The apparatus set forth in claim 21 further comprising means for adjusting position of said bath with respect to said light source.

26. The apparatus set forth in claim 25 wherein said position-adjusting means comprises means for adjusting position of said bath in two directions perpendicular to said light source.

27. The apparatus set forth in claim 26 wherein said position-adjusting means comprises a support plate, means for horizontally adjustably positioning said bath on said support plate, and means for adjustably vertically positioning said support plate.

28. The apparatus set forth in claim 27 wherein said horizontally positioning means comprises linear bearing means mounting said bath on said support plate, and means for moving said bath along said linear bearing means.

29. The apparatus set forth in claim 28 wherein said means for moving said bath comprises a lead screw coupled to said bath and means for rotating said lead screw.

30. The apparatus set forth in claim 29 wherein said lead screw extends beneath said support plate, and said bath is coupled to said lead screw by means extending through an elongated slot in said support plate.

31. The apparatus set forth in claim 29 wherein said vertically positioning means comprise a base plate, a plurality of lead screws supporting said support plate on said base plate, and means for simultaneously rotating all of said plurality of lead screws.

32. The apparatus set forth in claim 31 wherein said means for rotating said plurality of lead screws comprises a central gear rotatably mounted on said base plate, a plurality of gears surrounding said central gear and rotatably coupling said central gear to said lead screws, and means for rotating said central gear.

33. The apparatus set forth in claim 32 wherein said means for rotating said central gear comprises means for rotating said central gear at differing ratios for course and fine adjustment of vertical position of said support plate.

34. The apparatus set forth in claim 3 wherein said means for rotating the container comprises a chuck for releasably engaging the container finish and means for rotating said chuck.

35. The apparatus set forth in claim 34 wherein said chuck includes means for compliantly engaging the container finish to accommodate wobble of the finish with respect to the container body as the container is rotated.

36. The apparatus set forth in claim 35 wherein said chuck comprises a sleeve of elastic composition adapted to be received within the container finish, and means for axially compressing and radially expanding said elastic sleeve to engage the inside diameter of the container finish.

37. The apparatus set forth in claim 36 wherein said means for axially compressing and radially expanding said elastic sleeve comprise an elongated sleeve coupled to one end of said elastic sleeve, a rod coupled to an opposing end of said elastic sleeve and extending through said elongated sleeve, and a toggle clamp coupled to said rod and said elongated sleeve at ends thereof remote from said elastic sleeve.

38. The apparatus set forth in claim 37 wherein said chuck is removably positionable and manually rotatable on said apparatus.

39. The apparatus set forth in claim 38 further comprising means operatively coupled to said chuck when said chuck is positioned on said apparatus for indicating angular position of said chuck.

40. The apparatus set forth in claim 3 wherein said identifying means includes means for displaying to an operator glass layer thickness in the container sidewall.

41. The apparatus set forth in claim 3 further comprising means for controlling temperature of said oil in said bath.

42. The apparatus set forth in claim 41 wherein said temperature-controlling means comprises means for circulating the oil externally of the bath.

43. The apparatus set forth in claim 3 wherein said energy-directing means comprises means for directing polarized light energy tangentially through the sidewall of the container body in said bath to establish a birefringence pattern of light energy as a function of stress in the container body sidewall, and wherein said thickness-determining means is responsive to said birefringence pattern to determine thickness of the layer containing such stress.

44. For use in conjunction with a glass container having a finish and a body consisting of multiple layers of glass of differing composition, a method of measuring thickness of said at least one layer comprising the steps of:
  (a) rotating the finish of the container while structurally supporting the container body so that the body rotates about its axis independent of the axis of rotation of the finish,
  (b) directing light energy tangentially through the container body so as to establish a pattern of light energy as a function of thickness of said at least one layer, and
  (c) determining thickness of said at least one layer as a function of said pattern of light energy.

45. The method set forth in claim 44 wherein said compositions are such that two of such layers have differing indices of refraction, and wherein said light pattern includes information indicative of reflection of light energy from the interface between said layers.

46. The method set forth in claim 44 wherein said step (b) comprises the step of polarizing the light energy in a direction perpendicular to said axis of rotation, such that said light pattern comprises a birefringence pattern of light energy as a function of residual stress in said one layer.

47. The method set forth in claim 44 wherein said axis of rotation is horizontal.

48. The method set forth in claim 44 comprising the additional step of: (d) variably attenuating said light energy directed through the container body in said step (b) to accommodate glasses of differing opacity.

49. The method set forth in claim 44 wherein said step (a) is carried out by positioning the container body on cradle in a bath of oil that matches the index of refraction of the glass container outer surface.

* * * * *